United States Patent [19]

Bricker et al.

[11] Patent Number: 4,476,625

[45] Date of Patent: Oct. 16, 1984

[54] APPARATUS OF INSERTING WEDGES INTO THE SLOTS OF A MAGNETIC CORE

[75] Inventors: Robert W. Bricker, Fort Wayne; Timothy K. Pease, Kendalville; Michael G. Pease, Angola, all of Ind.; Jarvis Kirby, Galapolis, Ohio

[73] Assignee: Pease Machine & Tool, Inc., Huntertown, Ind.

[21] Appl. No.: 430,684

[22] Filed: Sep. 30, 1982

[51] Int. Cl.³ .............................................. H02K 15/10
[52] U.S. Cl. ....................................... 29/734; 29/596; 29/736
[58] Field of Search .................. 29/596, 732, 734, 736, 29/564.1, 564.6

[56] References Cited

U.S. PATENT DOCUMENTS

3,872,568 3/1975 Morr ..................................... 29/736
4,416,058 11/1983 Henry, Sr. et al. .................... 29/734

Primary Examiner—Carl E. Hall
Attorney, Agent, or Firm—Ronald D. Welch

[57] ABSTRACT

An improved pusher blade and wedge magazine assembly for use in a coil inserting machine and cooperative therewith for inserting the wedges into the elongated slots of a dynamoelectric machine core. The assembly provides pusher blades which are interlockingly and slidably engaged with the wedge magazine during all phases of operation of the machine. The wedge is conjointly rotatably by reason of an operative connection therebetween to eliminate torque or other stresses on the pusher blades. The assembly obviates misalignment between the wedge magazine and the pusher blades and thereby damage or destruction of the pusher blade assembly which can result form such misalignment.

18 Claims, 7 Drawing Figures

APPARATUS OF INSERTING WEDGES INTO THE SLOTS OF A MAGNETIC CORE

FIELD OF THE INVENTION

The present invention relates to an improved apparatus for inserting insulators or coil retaining wedges into the axially extending slots of the core of a dynomoelectric machine, the apparatus being part of apparatus which further inserts coil turns into the slots of the magnetic core. More particularly, the present invention provides an improved wedge inserting apparatus which eliminates jamming and misalignment which frequently occurs in such machines.

BACKGROUND OF THE INVENTION

In typical dynomoelectric machine such as an electric motor, generator, alternator, or the like, the stator assembly comprises a generally cylindrical stack of laminations made from a magnetic material and having a plurality of axially extending slots formed in the internal bore thereof. Electrical coils, or more specifically, the side turn portions of electrical coils, are then inserted into these slots in various configurations to produce a desired magnetic field for operation of the device. Because the insulation on the conductors which form the electrical coils can be easily damaged during assembly and insertion and because insertion of the coils into the proper slots is itself a difficult and exacting procedure, there have been developed a variety of complex precision machines for performing these operations. Such machinery includes apparatus for forming and inserting the coils, as well as for inserting the insulators and coil retaining wedges into the stator. Frequently these machines are integrated into a single assembly.

Representative of such machines are those disclosed in U.S. Pat. No. 3,722,063 issued to Richard B. Arnold and U.S. Pat. No. 3,829,953 issued to Richard E. Lauer et al, respectively.

A significant disadvantage in such prior art machines exists in the pusher blades and wedge magazine assembly. Typically, the pusher blades are long, precision machined elements, an arrangement dictated by the arrangement and operation of the machine. Accordingly, these blades are inherently expensive and fragile.

It is further charactertic of such machines to have the wedge magazine automatically loaded from a separate machine or assembly which forms the wedges or insulators and inserts them into wedge receiving slots of the magazine. In the course of loading the wedges into the magazine, the magazine is incrementally rotated or indexed. Subsequently, the pusher blades move axially into the wedge receiving slots of the magazine to force the wedges or insulators into the appropiate slots of the magnetic core. At this particular stage of operation of the machine, it is essential that the pusher blades be in precise alignment with the wedge receiving slots of the magazine. Conversely, any misalignment between the pusher blades and the magazine can result in damage or even destruction of the pusher blade assembly. Nonetheless, because of the configuration of the pusher blade and the arrangement of the blades with respect to the magazine in prior art machines, this misalignment accurs frequently. This results from a variety of factors including accumulation of tolerances in the relatively movable parts of the machine, distortion of the pusher blades themselves which can occur as a result of use and abuse, and incomplete cycling of the magazine.

When such a misalignment condition does occur and the blades are damaged or destroyed, there results both a substantial expense for replacement of the pusher blade assembly and attendant loss of time while the coil and insulator inserting apparatus is disassembled, repaired, and set-up.

Accordingly, it is a general object of the present invention to provide an improved insulator magazine and pusher blade assembly for receiving and inserting insulators or retaining wedges into a magnetic core in conjunction with a coil inserting apparatus which obviates misalignment therebetween.

Another general object of the invention is to provide an improved apparatus for inserting coils and insulators in the slots of a dynamoelectric machine stator.

Yet another object of the invention is to provide such an apparatus in which the insulator pusher blades are rotatably engaged with the rotating wedge magazine to obviate misalignment therebetween during all phases of operation of the apparatus.

Still another object of the invention is to provide such an apparatus in which the pusher blades are slidably supported by the wedge magazine during all phases of operation of the apparatus.

Yet another object of the invention is to provide such an apparatus in which rotation of the pusher blades is effected by synchronous rotation of the pusher blade base and the wedge magazine through the medium of an internal shaft without application of torque to or through the pusher blades.

Still another object of the invention is to provide an improved pusher blade-wedge magazine assembly adaptable for incorporation into existing coil and insulator inserting machinery without significant modification to other parts of the machine and which obviates damage or destruction to the pusher blade assembly resulting from misalignment between the pusher blade assembly and the wedge magazine.

Yet another object of the invention is to provide an improved coil and insulator inserting machine incorporating an improved wedge magazine-pusher blade assembly which substantially reduces problems associated with such assemblies in prior art machines.

SUMMARY OF THE INVENTION

In the broader aspects, the present invention is an improved pusher blade and wedge magazine assembly for use in a coil inserting machine and cooperative therewith for inserting the wedges into the elongated slots of a dynamoelectric machine core. The assembly provides pusher blades which are interlockingly and slidably engaged with the wedge magazine during all phases of operation of the machine. The wedge magazine and the supporting base for the pusher blades are conjointly rotatable by reason of an operative connection therebetween to eliminate torque of other stresses on the pusher blades. The assembly obviates misalignment between the wedge magazine and the pusher blades and thereby damage or destruction of the pusher blade assembly which can result from such misalignment.

In accordance with other aspects of the invention, the pusher blade assembly is engaged during all phases of operation of the machine, with the wedge magazine, the blades and blade base assembly are fixedly coupled for conjoint rotation during all phases of operation the machine. Rotational movement and indexing of the wedge magazine is effected by an external mechanism and force is transmitted from the wedge magazine to the pusher blade assembly base by the mechnical connection. Accordingly, misalignment between the pusher blades and the associated slots of the wedge magazine as well as distortion of the blades is obviated.

A still further aspect of the invention is that the wedge magazine, because it at all times slidably engages the pusher blades adjacent their distal ends, provides positive support for the pusher blades both with respect to axial loads and transverse loads. This further obviates damage that may occur to the pusher blades as they move from the wedge magazine through the stripper assembly and into the stator core.

The subject matter which we regard as our invention is particularly pointed out and distinctly claimed in the concluding portion of this specification. The invention itself, however, taken with further objects and advantages thereof, may be best understood by reference to the following description of the invention taken in conjunction with the accompanying drawings in which:

DESCRIPTION OF THE PREFERRED EMBODIMENT

Referring now to the drawings, there is shown the mechanism of a coil inserting apparatus in conjunction with the stator receiving and aligning apparatus of a typical coil inserting machine in conjunction with the improved wedge magazine and insulator-wedge inserter mechanism of the present invention. The mechanism, indicated generally at 10 comprises an annular mounting plate 12 having a flange portion 14 extending radially outwardly from boss portion 16. Boss portion 16 may be varied in dimension and configuration to adapt mechanism 10 for use in machines of various manufacture. Mounting plate 12 further includes an annular central bore 18 having rabbets 20 and 22 formed therein in axially displaced relationship. Rabbet 22 is further machined at 24 to provide a seat for the outer race of a ball bearing 26.

An annular, flanged adapter plate 28 is fixedly secured to the mounting plate 12 by means of threaded fasteners 30. The adapter plate 28 is aligned with the mounting plate 12 by means of a guide ring 32 which is fixedly secured to the surface 34 of adaptor plate 28 by threaded fasteners 36. In practice, the adaptor plate 28 can be provided in any desired dimensions to accommodate wedge guide and coil turn feeder blades of various dimensions as described in more detail below.

Figure 2:
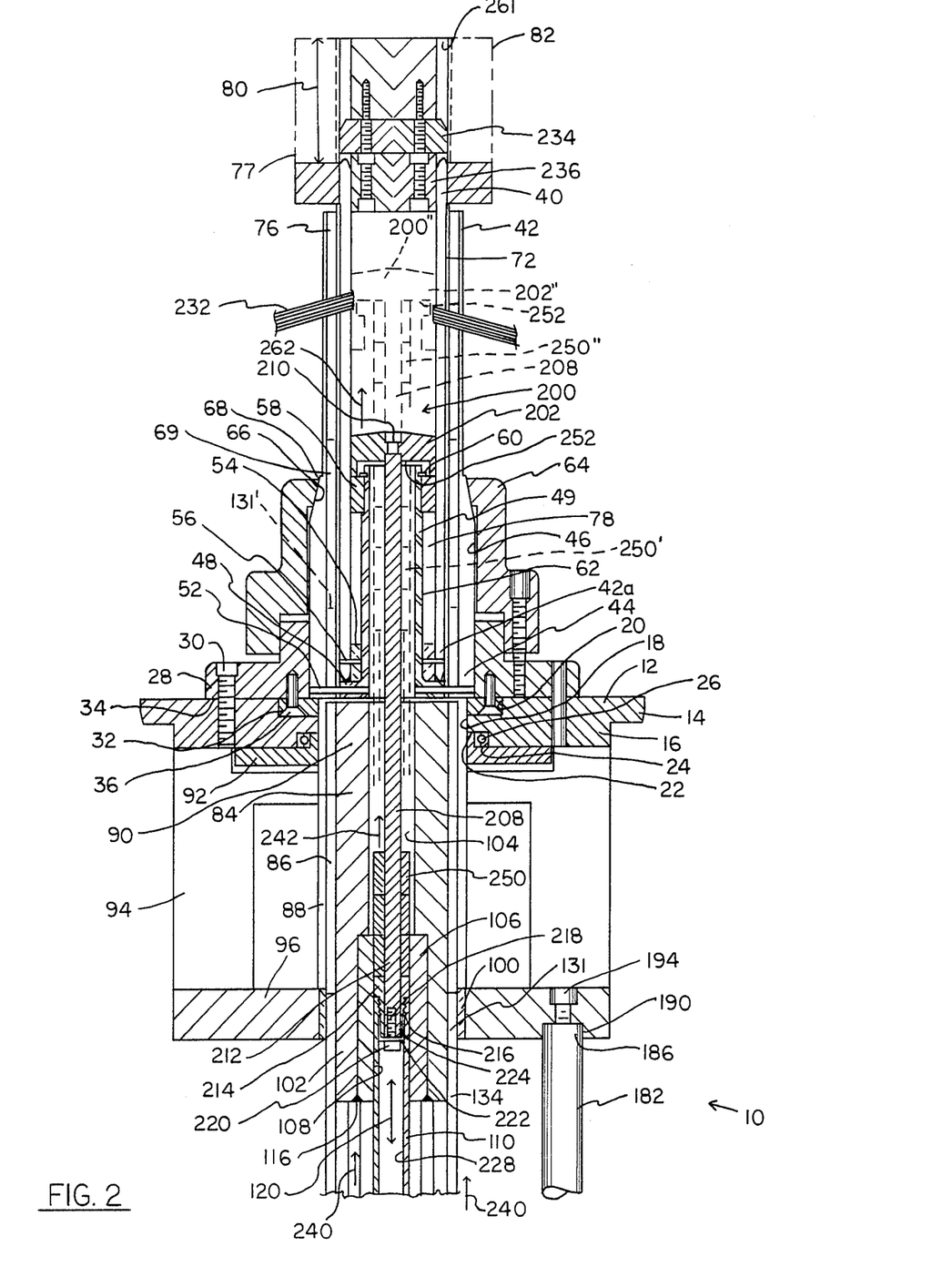
FIG. 2 is a fragmentary axial cross-sectional view of the upper portion of a coil and wedge inserting apparatus incorporating the present invention.
Figure 4:
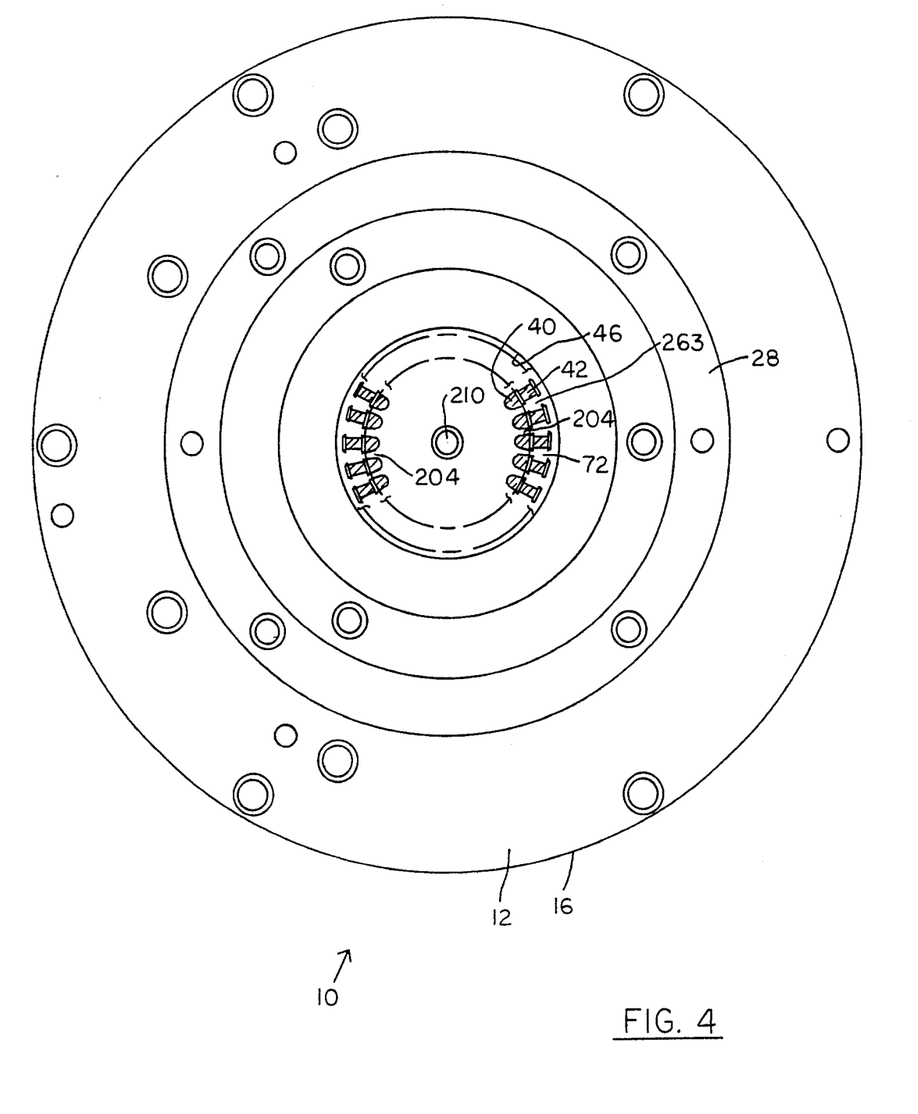
FIG. 4 is a transverse cross-sectional view of the apparatus taken along section line 4—4 of FIG. 1.
Figure 5:
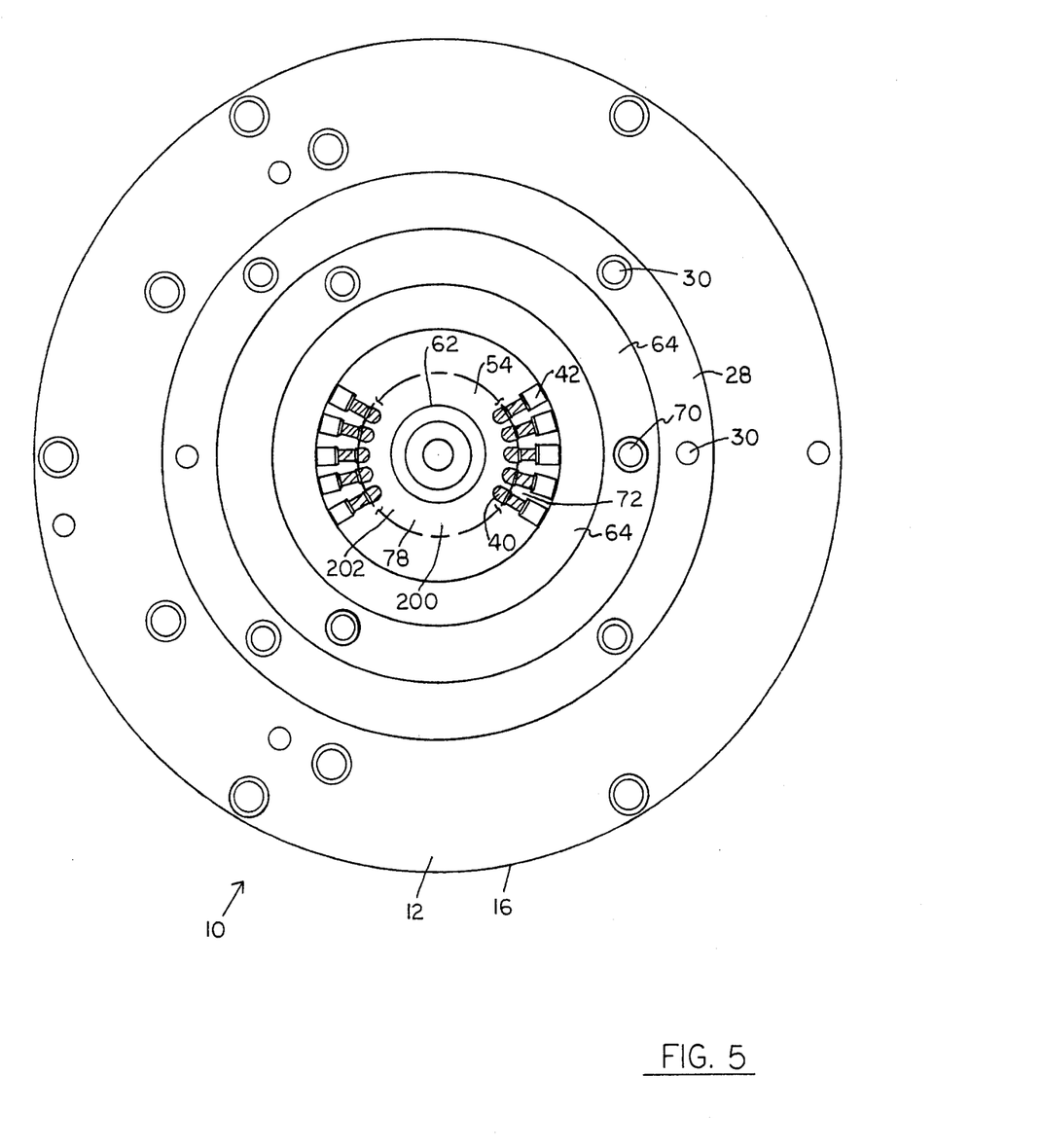
FIG. 5 is a transverse cross-sectional view of the apparatus taken along section line 5—5 of FIG. 1.

As can best be seen in FIGS. 2 and 4 a cross-sectionally symetrical array of coil turn feeder blades 40 and concentrially disposed wedge guide blades 42 are secured with their proximal ends 42a, 44, within the bore 46 of hub 28. An elongated, generally cylindrical support column 49 is disposed concentrically inside the coil turn feeder blade and wedge guide blade arrays, column 46 having a flanged end 48 to which the proximal ends 44 of the wedge guide blades are secured by means such as dowel pins 52. The coil turn feeder blades are, in turn, fixedly secured to annular notched ring 54 by dowel pins 56 and are slidably received in and guided by another notched ring 58. As can best be seen in FIG. 5, both notched rings 54 and 58 have a plurality of semi-circular notches formed in the outer circumference thereof, the notches being equally spaced and complementry to the cross-section of the coil side turn feeder blades 40. Notched ring 58 is retained on the column 46 by means of a retaining ring 60 while notched ring 54 is slideable on the outer cylindrical surface 62 of column 46.

The array of coil side turn feeder blades and wedge guide blades are fixedly secured to the adapter 28 and mounting plate 12 by means of a hollow cylindrical collet 64. Collet 64 has a tapered surface 66 complementary to the tapered outside surface 68 defined by the portions 69 of the array of wedge guide blades 42. Collet 64 is secured by means of threaded fasteners 70 and, when tightened, positively clamps the wedge guide blades 42 and coil turn feeder blades 40 into position.

It will be observed that the coil turn feeder blades and wedge guide blades 42 are, when assembled, aligned to define therebetween a plurality of coil receiving slots 72. It will further be observed that the relative position of the coil side turn feeder blades 40 and wedge guide blades 42 can be selectively adjusted by reason of the slideable engagement of collar 54 on column 46. This allows selective adjustment of the amount of extention of the coil turn feeder blades 40 above (as viewed in FIG. 2) the distal ends 76 of the wedge guide blades to accommodate for core stacks 77 of different heights. The maximum range of heights for any given set of coil turn feeder blades and wedge guide blades will of course be determined by the length of the annular slot 78 between the collars 54, 58 and the dimensions of the blades themselves. In FIG. 2, the maximum range of the stack heights is indicated by arrow 80 and dashed line 82, the latter showing the maximum stack height and the solid lines indicating the minimum stack height.

Figure 6:
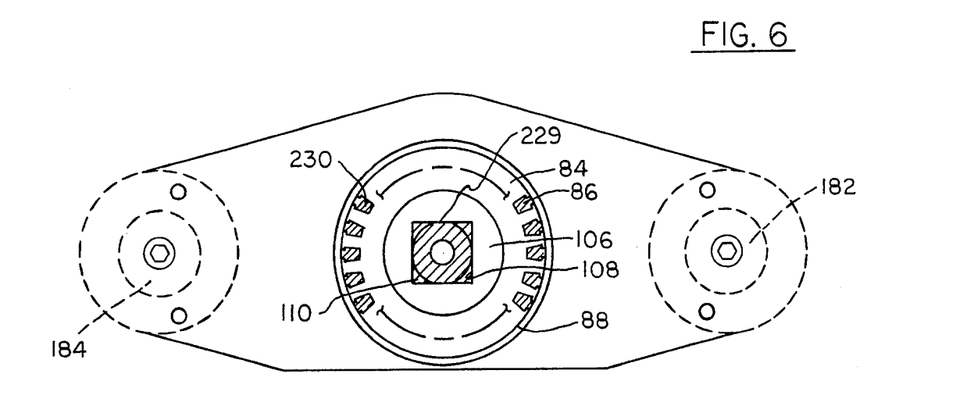
FIG. 6 is a transverse cross-sectional view of the apparatus taken along section line 6—6 of FIG. 1.

Rotatably mounted to the mounting plate 12 adjacent the coil turn feeder blades and wedge guide blade arrays above described is a wedge magazine 84 which can best be seen in FIGS. 2 and 6. Wedge magazine 84 is an elongated, generally cylindrical member having a plurality of axially extending slots 86 formed in its exterior surface 88. A ratchet wheel 92 is fixedly secured to the top (as viewed in FIG. 2) end 90 of magazine 84. Ratchet wheel 92 in turn is rotatably supported in the inside race of ball bearing 26.

Figure 1:
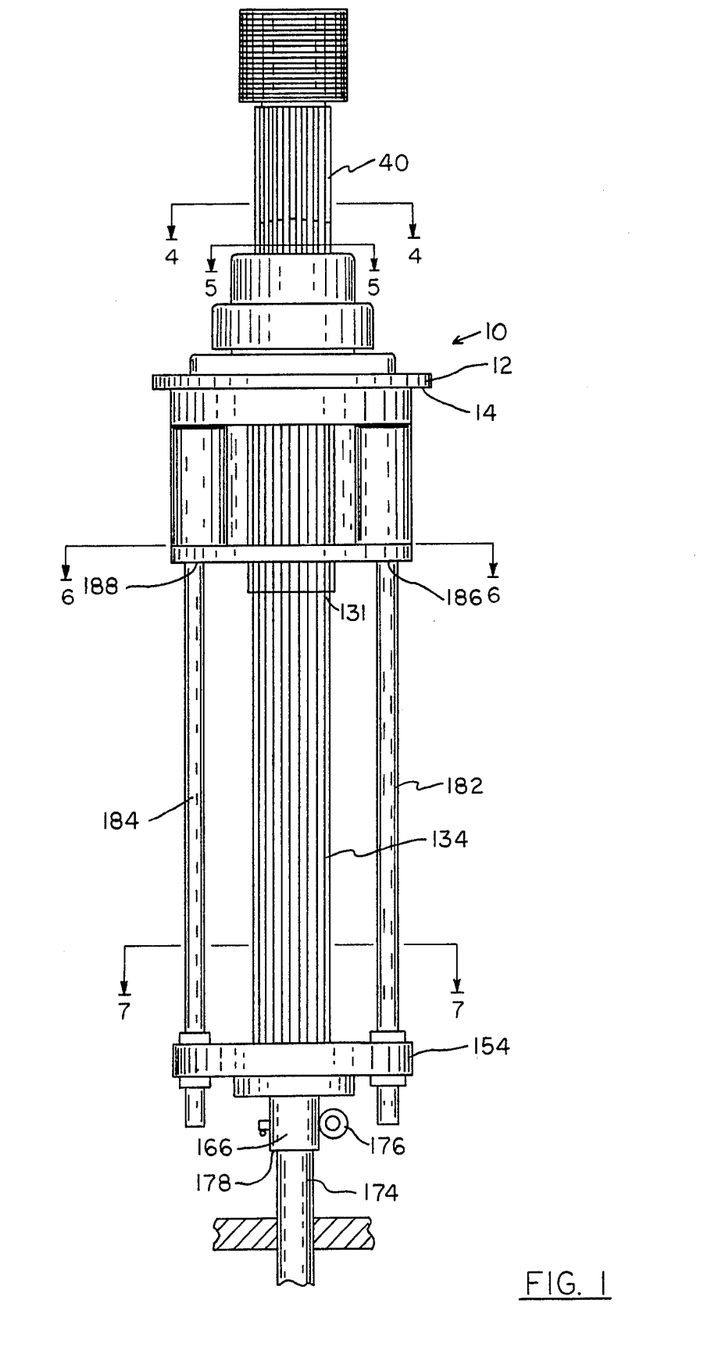
FIG. 1 is a side plan view of a coil and wedge inserting apparatus in accordance with the present invention.

A cast support member 94 is secured by threaded fasteners (not shown) to mounting plate 12, support member 94 depending downwardly therefrom and having an inwardly extending annular flange 96 at its lower (as viewed in FIG. 2) end. A cylindrical bore extends axially through flange 96 and cylindrical bushing 100 is fixedly received therein, bushing 100 rotatably supporting the lower (as viewed in FIG. 1) end 102 of the wedge magazine 84.

The axial cylindrical bore 104 of magazine 84 has fitted therein an adaptor coupling 106 adjacent end 102 thereof. Adaptor coupling 106 is provided with a rectangular bore 108 in which is slidably received a hollow, rectangular shaft 110 adaptor coupling 106 being fixedly secured to the wedge magazine 102 by means such as welding at 116. The shaft 110 is, accordingly, axially slidably engaged by the coupling 106 to magazine 84 as indicated by double ended arrow 120 while simultaneously being locked against rotational motion with respect thereto.

The end 122 of shaft 110 is externally threaded to engage a threaded bore 126 of a wedge pusher blade holder or base member 128. The shaft 110 and base 128 are fixedly locked together by means of a suitable pin or set screw (not shown).

Figure 7:
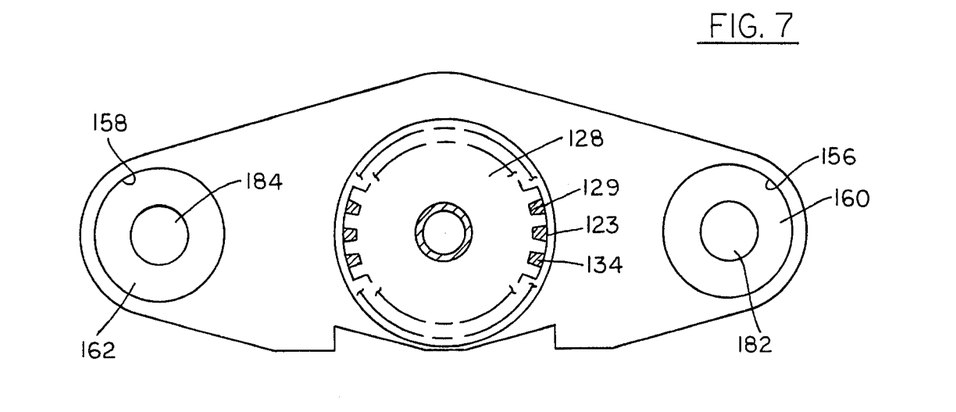
FIG. 7 is a transverse sectional view of the apparatus taken along section line 7—7 of FIG. 1.

As can best be seen in FIGS. 2 and 7, the wedge pusher blade base member 128 is a circular element having a plurality of notches 129 formed in the reduced diameter portion 123 thereof. A plurality of wedge pusher blades 134 are received in the notches and fixedly secured to the base member 128 by means such as brazing or silver soldering.

The distal ends 131 of the pusher blades 134 are slidably received in the slots 86 of wedge magazine 84.

Member 128 further includes a machined, cylindrical bearing surface 140 and a reduced diameter neck portion 142. Surface portion 140 and neck 142 of member 128 are received in a cylindrical bushing 144 and the internal bore 146 of a thrust bearing 148, respectively, bearing 148 being received in complementary recess 152 of a base plate 154. Base plate 154, as can best be seen in FIG. 17, is a generally a elongate plate member having recess 152 machined therein and further having a pair of circular bores 156, 158 formed in the opposite ends thereof. A pair of linear ball bearing assemblies 160, 162 are press fitted into the bores 156, 158.

Figure 3:
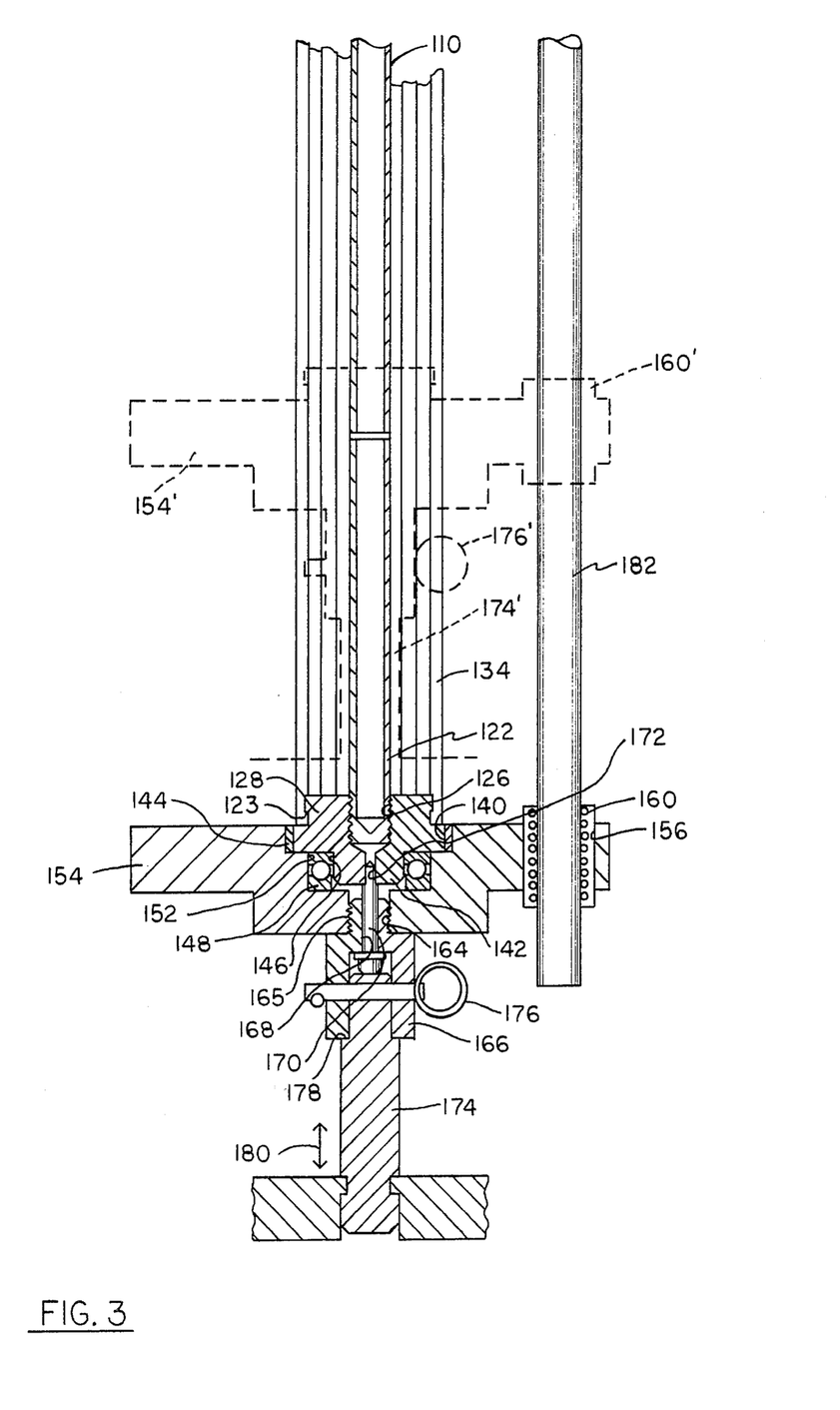
FIG. 3 is a fragmentary cross-sectional view of the lower portion of the apparatus.

The bottom (as viewed in FIG. 3) end of the base plate 154 is provided with a threaded hole 164 to which is engaged the threaded portion 165 of a guide collar 166. The collar 166 is further provided with a small diameter pilot bore 168 in which is received a pilot pin 170 which engages a pilot bore 172 in the holder 128. The collar 166 is further operatively engaged to a push rod 174. A quick release pin 176 secures the collar 166 to rod 174 and force is applied to collar 166 via shoulder 178. The distal end of the push rod 174 is coupled to a suitable drive assembly (not shown) which will impart axial linear movement to the rod 174 as indicated by arrow 180. In some machines this assembly will be an hydraulic, double acting cylinder while in another applications it may comprise a rotating threaded shaft and shaft follower, such assemblies being will known to those skilled in the art. In all configurations, it is necessary that the drive mechanism provide a smooth linear movement of predetermined stroke in accordance with the particular parameters of the machine.

A pair of elongated machined guide shafts 182, 184 are slidably received in the linear bearings 160, 162 and are fixedly secured at their ends 186, 188, respectively to cast support member 96 by means of complementary recesses 190 and threaded fasteners 194.

The last major assembly of the apparatus 10 is a stripper assembly indicated generally at 200. Assembly 200 comprises a stripper element 202 which has a generally circular notched configuration as best seen in FIG. 4. The element 202 includes a plurality of blades 204 which are slidably received in respective ones of notches 72 defined between the coil side turn feeder blades 40 and wedge guide blades 42. The stripper element 202 is fixedly connected to an elongated shaft 208 by means of a threaded fastener 210. The shaft 208 is in turn slidably received at its distal end 212 in a threaded collar 214, the latter being engaged by internal threads formed in the end 216 of rectangular shaft 110. The end 212 of shaft 208 is provided with a threaded hole 218 in which is received a threaded fastener 220. Fastener 220 in turn retains a stop washer 222 and collar 224. Washer 222 and collar 224 are slidably received within the internal bore 228 of shaft 110. Each includes at least one flat surface 229 slidably engaged with the internal bore 228 to thereby lock the shaft 208 against relative rotational movement with respect to the shaft 110 while simultaneously permitting the shaft 208 to be telescopically received within the bore 228.

In the operating sequence of the apparatus 10, the components of the apparatus 10 are initially in the positions shown in solid lines in FIG. 2. The first sequence comprises the insertion of retaining wedges 230 into the magazine 84. The wedges 230 are elongated plastic elements typically having a cross section such as that shown in FIG. 6. The wedges 230 are inserted individually into the slots 86 of magazine 84. As each wedge 230 is inserted into the slots 86, the magazine 84 is incremented or indexed by means of the ratchet mechanism including the ratchet wheel 92 to sequentially position individual ones of the slots 86 in alignment with the wedge loading mechanism (not shown). Such wedge magazine loading mechanisms being well known to those skilled in the art and do not require detailed description herein.

As the magazine 84 is rotated during the loading sequence, the torque applied to the magazine 86 via the ratchet wheel 92 is transmitted through coupling 106 to rectangular shaft 110. The shaft 110 in turn transmits this torque to the wedge inserter blade base member 128. Accordingly, the wedge pusher blades are rotated by rotational forces applied both by the slots 86 in magazine 84 which engages the ends 138 of blades 134 and the blade base member 128.

Next in sequence, the coil turns, shown only fragmentarily at 232 in FIG. 2 are loaded into the appropriate slots 72. The appropriate stator stack 77 is then positioned over the coil turn feeder blades 40, the stack being guided by means of a suitable alignment tool 234. Tool 234 is typical of those known in the art and comprises a notched disk element 236 having teeth (not shown) which complement the slots 72 thereby providing precise alignment of the stator slots with the respective slots 72. The stack is then clamped in position with a conventional clamping assembly (also not shown) and the alignment tool 234 is removed.

Initially, with the apparatus 10 of the present invention now being loaded with the wedges 230 and coils 232 and the appropriate stator stack 82 the machine commences its insertion sequence from the position shown in FIG. 2 in solid lines. The prime mover (not shown) now moves the shaft 174 upwardly (as viewed in FIG. 2). This movement is in turn transmitted by the collar 166 to the base plate 154 and through thrust bearing 148 to the wedge base member 132. The entire base assembly indicated generally at 236 is precisely guided in its linear movement by the guide shafts 182, 184.

Simultaneously, the wedge inserter blades 134 move upwardly as indicated by arrows 240. Simultaneously, the shaft 110 slides upwardly as indicated by arrow 242 through the bore, 198 of adaptor 106. During this sequence of the operation, the shaft 208 and associated stripper assembly 200 remain stationary with the shaft 214 being telescopically received into the internal bore 228 of shaft 110.

During this portion of the stroke, the wedge inserter blades engage the bottom (as viewed in FIG. 2) ends of the retaining wedges which are then pushed upwardly in the slots 86 and into the slots 42 of the wedge guide blades 42.

Next in sequence, spacers 250 selectively placed on shaft 208 move into engagement with the inside bottom surface 252 of the stripper 200. The spacers 250 are selected such that this engagement occurs when the top (as viewed in FIG. 2) ends of the wedges 230 have moved into a position just below the bottom most one of the coil turns 232 which are positioned in the slots 72.

The position of the major components of the apparatus at this point in the operating sequence are shown by dashed lines and like numerals denominated by the prime mark. As the stroke of the prime mover continues, the entire wedge inserting assembly including the blades 134 continues to move upwardly and simultaneously, stripper 200 now also commences upward movement as indicated by arrow 262. The stripper, in turn, moves the coil turns 232 upwardly in the slots 72 forcing them into the appropiate and respectively aligned ones of the slots 261 of the stator stack 82. Simultaneously, the coil wedges are moving upwardly through the respective slots 263 (FIG. 4) defined by the wedge guide blades 42 in synchromism with movement of the coil turns 232. Ultimately, the coil turns 260 are moved fully into the respective slots 261 of the stator stack 82 and the wedges 230 are forced into the slots 261 of the stator thereby positively retaining the coil turns in their proper inserted positions.

When all of the coils and wedges have been thus inserted the stator is removed. Between each insertion sequence, the prime mover again returns to its initial position as shown in solid lines in FIG. 2. The downward motion is transmitted to the collar 166 via quick release pin 176 and via threads 164 to the base 154 and related parts. At a predetermined portion of this downward stroke, the threaded collar 214 engages the retaining collar 224 connected to the shaft 208 which in turn moves the stripper assembly 200 downwardly into its initial or starting position. This completes the operating cycle or the apparatus.

It will be observed from the above description that because of the arrangement and engagement provided between the wedge magazine, the wedge pusher blades 134, the pusher blade base member 132, the positive mechanical coupling between the magazine 84 and the holder 128, the pusher blades 134 are positively supported at both their base end upper ends. The blades 134, because they are received at all times in respective ones of the slots 86, cannot become misaligned with these slots. Accordingly, the novel structure of the present invention obviates any possibility of damage to the pusher blades 134 which can result from such misalignment, and any bending or damage to the blades which can result from the relatively long and fragile blades being unsupported at their upper ends. Further, by reason of the transmission of the rotational forces to the blades at both their upper and lower ends by the magazine and base member 132, respectively, bending moments that can distort the blades are substantially eliminated. This configuration is in sharp contrast to prior art machines wherein the pusher blades are allowed to float freely at their upper ends and are required to move into engagement with the respective ones of the slots in the wedge magazine only after the upward cycle of the prime mover commences or are used as a torque transmitting mechanism.

Because of the freely rotateable base member 128 and by reason of all of the torque required to rotate the assembly being transmitted by shaft 110 rather than through the blades 134, bending moments and subsequence deformation of the blades 134 is obviated. Nonetheless, the entire pusher blade and magazine assembly is adaptable for use in a wide variety of existing coil and insulator insertion making without significant modification other than incorporation of the assembly described in the present invention.

These novel benefits, accordingly, provide significant improvements in the operation, efficiency, and cost of such machining.

While there have been described above the principles of this invention in connection with specific apparatus, it is to be clearly understood that this description is made only by way of example and not as a limitation to the scope of the invention.

What is claimed is:

1. Apparatus for inserting retaining wedges into axially extending slots of a magnetic core having axially extending slot entrances in communication with said bore in co-operation with apparatus for inserting coil side turn portions into said slots and including coil side turn feeder blade means for receiving and guiding a plurality of electrical coils into said slots, stripper means for moving said coils from said coil blade means into said core in positions with side turn portions thereof disposed in said slots, the apparatus comprising: a stationary circular array of wedge guide blades encircling said coil side turn feeder blade means and defining there between a plurality of wedge guide slots having cross-sections complementary to the cross-section of a coil retaining wedge and disposed in longitudinal alignment with predetermined portions of said magnetic core slots, a wedge magazine rotatably mounted in axial alignment with said wedge guide blades and having a circular array of wedge receiving slots formed in the surface thereof, said array of wedge receiving slots being congruent with said wedge guide slots, means for incrementally rotating said magazine into a plurality of positions with said slots disposed in alignment with said wedge guide slots, a plurality of elongate wedge inserter blades having cross-sections complementary to said wedge receiving slots, said wedge inserter blades having one end thereof slidably received in a respective end portion of said wedge receiving slots distal said wedge guide blades, the ends of said wedge inserter blades distal said magazine being fixedly secured to a base member, means fixedly connecting said base member to said magazine for conjoint rotation therewith, prime mover means for moving said wedge inserter blades longitudinally through said wedge receiving and wedge guide slots to thereby insert wedges received in said magazine into said magnetic core slots, said base member being rotatably connected to said prime mover means, said stripper means being operatively coupled to said connecting means for movement therewith during a predetermined portion of the movement of said wedge inserter blades.

2. The apparatus of claim 1 wherein said coupling means includes an elongated shaft fixedly secured at one end to said base member, said shaft being slidably received in said magazine at its opposite end.

3. The apparatus of claim 2 wherein said stripper means further includes an elongated stripper shaft, wherein said shaft is hollow, said stripper shaft being rotatably, telescopically received in said coupling means shaft, said coupling means further including means for abuttingly engaging said stripper means at a selectively predetermined point in the linear movement of said coupling means, whereby, further linear movement of said coupling means produces linear movement of said stripper means.

4. The apparatus of claim 3 wherein said magazine is hollow, the outside longitudinal surface of said coupling means shaft being rectangular, said coupling means including a coupling element fixedly secured to said magazine and having an axial rectangular bore therein slidably engaging said coupling means shaft.

5. The apparatus of claim 4 wherein said coupling means further includes a preselected number of spacers received on said stripper means shaft, oppositely disposed ones of said spacers abuttingly engaging said stripper means and said coupling means shaft at said predetermined point in the linear movement thereof.

6. The apparatus of claim 5 wherein said prime mover includes a base pusher member, and further including base bearing means rotatably supporting said base member in said base pusher member.

7. The apparatus of claim 6 wherein said bearing means includes a ball bearing rotatably supporting said base member in said base pusher member, and a thrust bearing interposed between said base member and said base pusher member, axial forces being transmitted from said pusher member to said base member through said thrust bearing.

8. The apparatus of claim 7 further including supporting structure means for mounting said apparatus in a said coil inserting apparatus, said supporting structure means including means for guiding said base pusher member in a rotationally fixed position with respect to said supporting structure as said base pusher member moves longitudinally with respect thereto.

9. The apparatus of claim 8 wherein said guiding means includes a pair of elongated shafts fixedly secured at one end thereof to said supporting structure, a pair of through holes in said base pusher member in axial alignment with said shafts, linear bearings received in said holes and slidably engaging said shafts.

10. The apparatus of claim 9 further including second bearing means rotatably supporting said magazine in said supporting structure.

11. The apparatus of claim 10 wherein said means for rotating said magazine includes a ratchet mechanism.

12. An apparatus for inserting retaining wedges into axially extending slots communicating with the bore or a magnetic core comprising: a wedge magazine having a plurality of axially extending wedge receiving slots in the exterior surface thereof, a base member, a plurality of elongate wedge inserter blades fixedly secured at one end thereof to said base member, there being one said blade for each said wedge receiving slot in said magazine, a cross-section of said blades being complementary to the cross-section of said wedge receiving slots, the opposite ends of said blades being slidably received in respective one of said wedge receiving slots, coupling means for rotatably coupling said magazine to said base member for conjoint rotation therewith, said coupling means being longitudinally slidably engaged with said magazine whereby said blades may move longitudinally through said slots.

13. The apparatus of claim 12 wherein said coupling means includes a shaft having a rectangular cross-section, a coupling member fixedly secured to said magazine and having a rectangular opening therethrough complementary to said coupling means shaft, said coupling shaft being slidably received therethrough.

14. The apparatus of claim 13 further including prime mover means for moving said wedge inserter blades axially with respect to said magazine, said base member being rotatably connected to said prime mover.

15. The apparatus of claim 14 further including a supporting structure, including a means operatively engaged with said base pusher member to maintain said base pusher member in fixed rotational position with respect to said supporting structure, said base pusher member being slidably engaged with said guiding means for axial movement with respect thereto.

16. The apparatus of claim 15 wherein said guiding means includes a pair of elongated shafts fixedly secured to said supporting structure with their axes parallel to the longitudinal dimensions of said wedge pusher blades, said base pusher member including a pair of linear ball bearing slidably engaged with said shafts.

17. The apparatus of claim 16 further including means operatively coupled to said coupling means for operatively engaging and axial moving a coil inserting apparatus.

18. The apparatus of claim 16 further including bearing means rotatably supporting said magazine in said supporting structure.

* * * * *